Oct. 16, 1956  J. D. WATTS ET AL  2,766,829
CONDUIT CONNECTIONS AND SEALING MEANS THEREFOR
Filed March 4, 1953 7 Sheets-Sheet 1
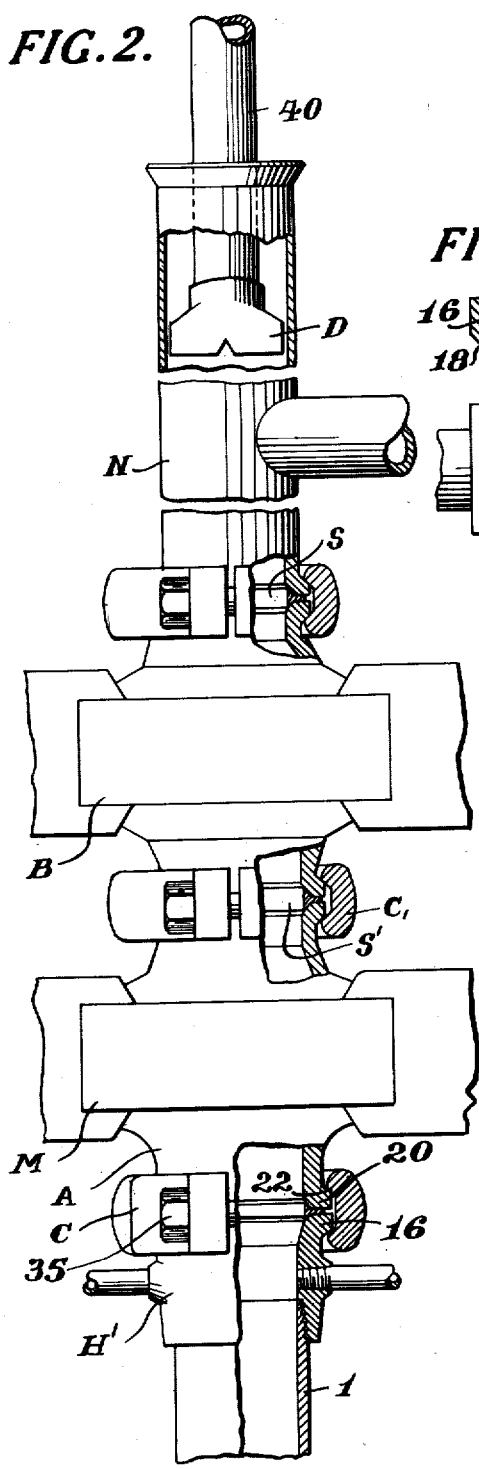
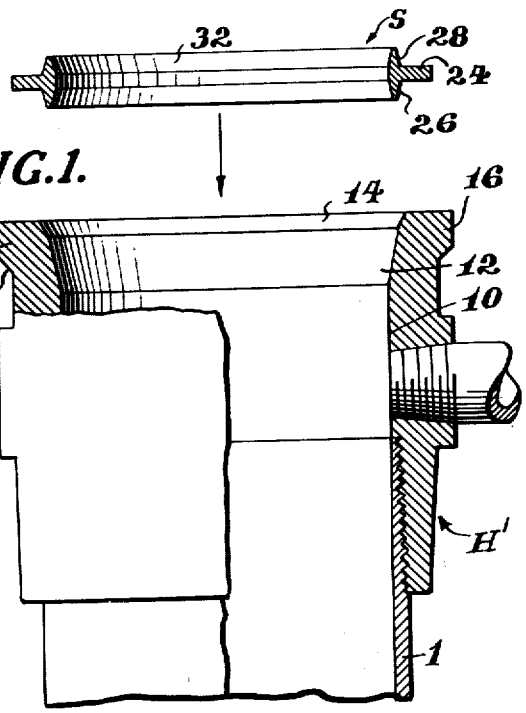
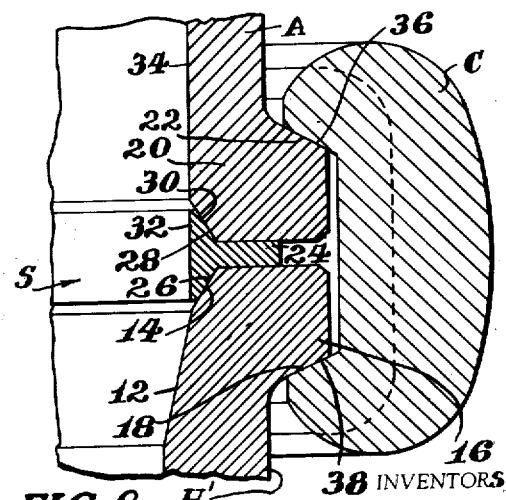
INVENTORS
John D. Watts
Erwin F. Hill
BY Cushman, Darby & Cushman
ATTORNEYS Oct. 16, 1956 J. D. WATTS ET AL 2,766,829
CONDUIT CONNECTIONS AND SEALING MEANS THEREFOR
Filed March 4, 1953 7 Sheets-Sheet 2

INVENTORS
John D. Watts
Erwin F. Hill
BY Cushman, Darby & Cushman
ATTORNEYS

Oct. 16, 1956 J. D. WATTS ET AL 2,766,829
CONDUIT CONNECTIONS AND SEALING MEANS THEREFOR
Filed March 4, 1953 7 Sheets-Sheet 3

INVENTORS
John D. Watts
Erwin F. Hill
BY Cushman, Darby & Cushman
ATTORNEYS

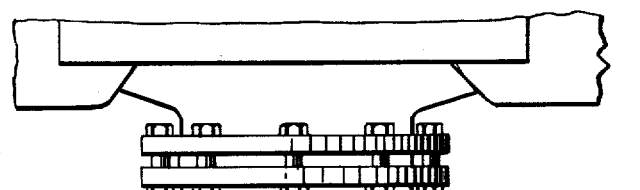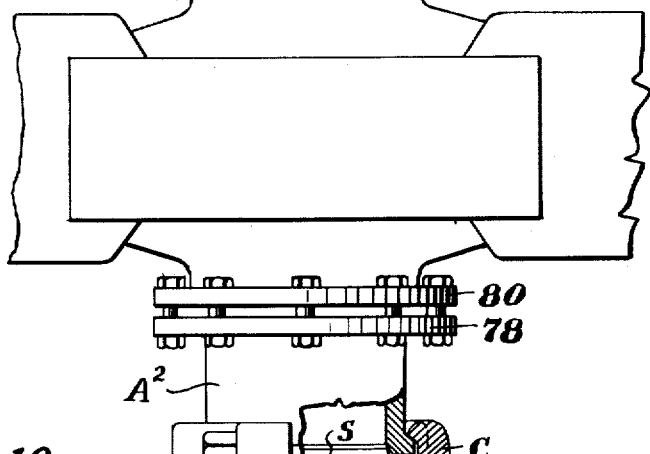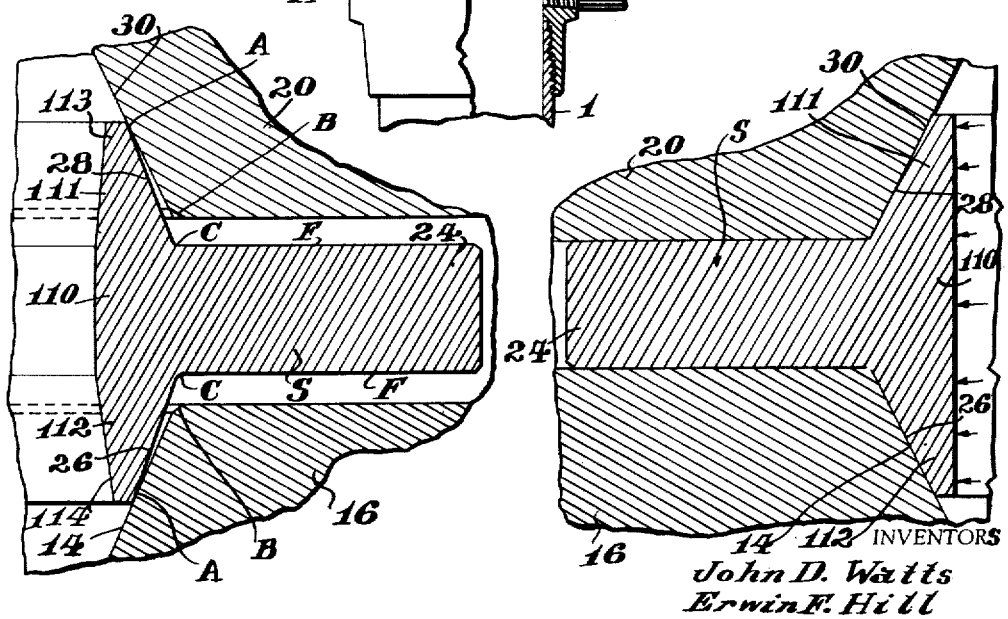

INVENTORS
John D. Watts
Erwin F. Hill

BY Cushman, Darby & Cushman
ATTORNEYS

Oct. 16, 1956 J. D. WATTS ET AL 2,766,829
CONDUIT CONNECTIONS AND SEALING MEANS THEREFOR
Filed March 4, 1953 7 Sheets-Sheet 6
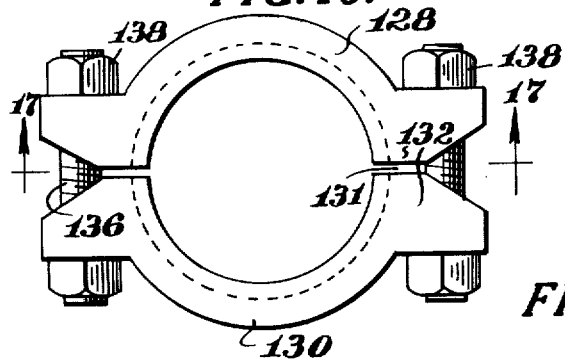
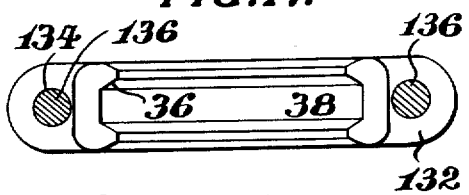
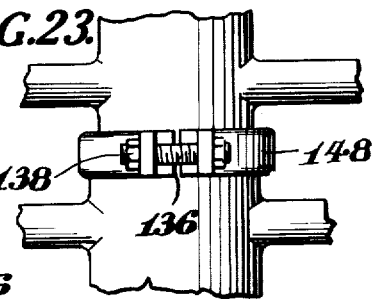
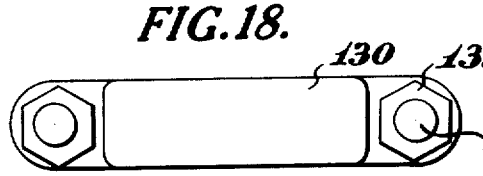
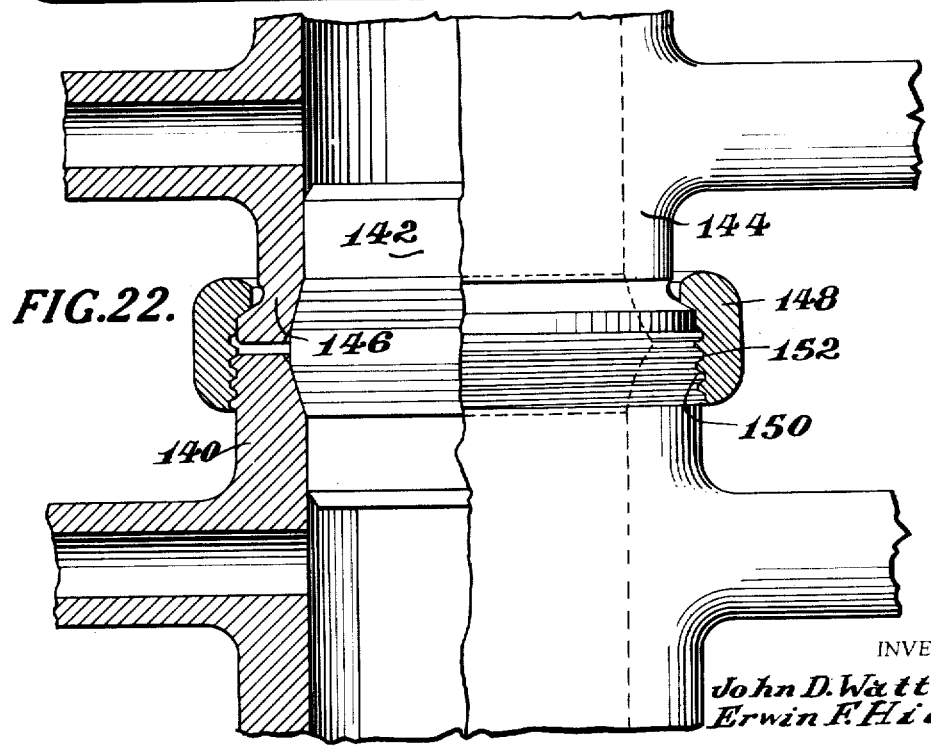
INVENTORS
John D. Watts
Erwin F. Hill
BY Cushman, Darby Cushman
ATTORNEYS

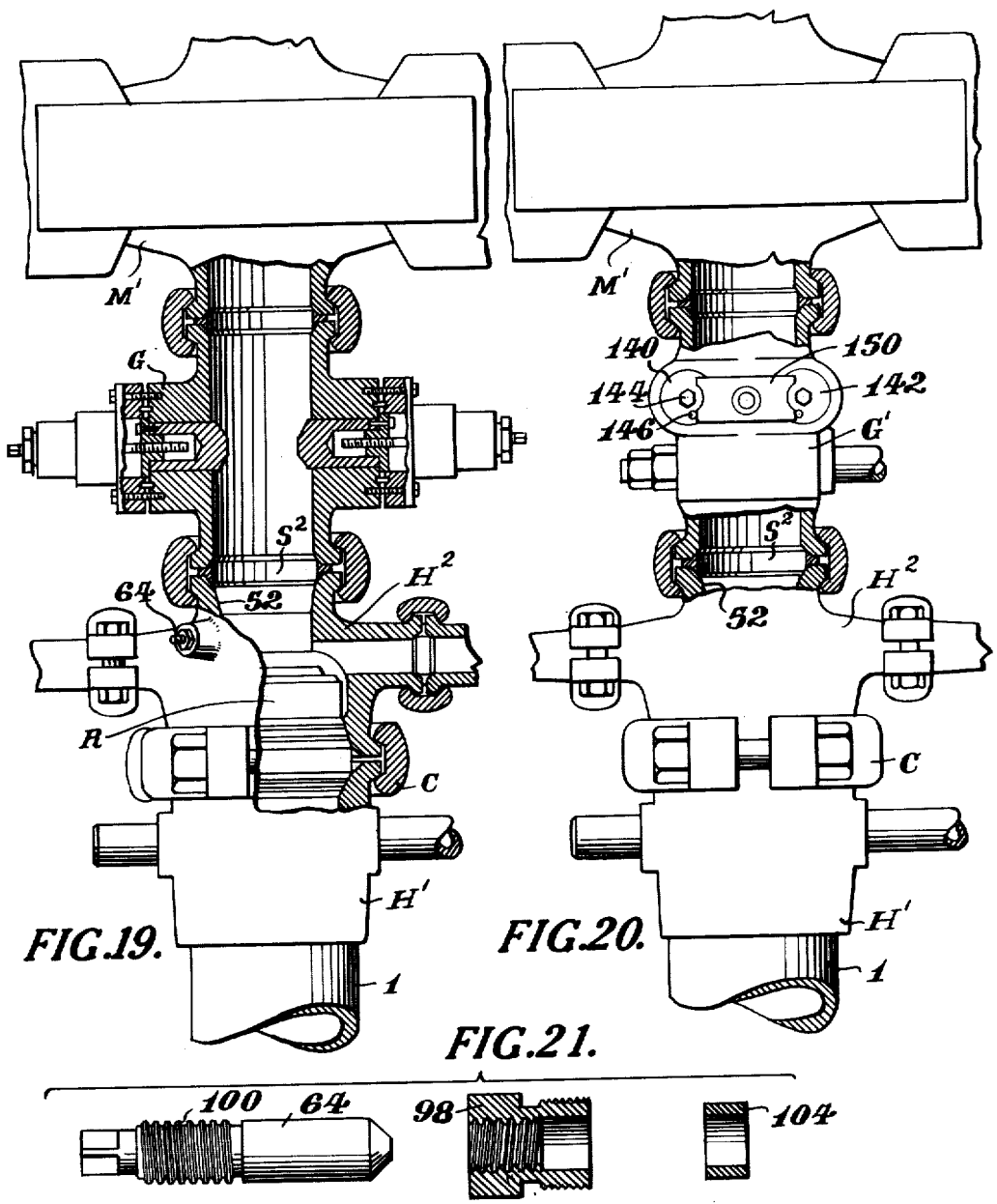

United States Patent Office 2,766,829
Patented Oct. 16, 1956

2,766,829

CONDUIT CONNECTIONS AND SEALING MEANS THEREFOR

John D. Watts and Erwin F. Hill, Houston, Tex., assignors to Gray Tool Company, Houston, Tex., a corporation of Texas Application March 4, 1953, Serial No. 340,372

29 Claims. (Cl. 166—75)

The present invention relates to conduit connections and sealing means therefor. The ends of the conduit parts, either ordinary pipe parts of any system for conveying fluid, or the special parts of a well head, are formed to engage with a sealing ring of hard metal or the like to form a seal capable of withstanding high fluid pressure when the ends of the conduit parts are drawn toward one another.

While we disclose herein a novel sealing ring used at various points in a well head installation, and in connection with a system of well control as described, and in association with a particular type of clamping assembly to secure the ends of the conduit parts together, it will be understood that this sealing ring can be used with other types of connections, and at places other than on a well head, and that this sealing ring may be effectively used in other than the clamp type union as described herein. For instance, the sealing ring may be used effectively in association with screwed or ordinary flange bolted unions as now known in the art. It may be used in ordinary pipe connections, or in the connections of oil well pipe, such as drill pipe, casing or tubing, or in flow line pipe from the well, or in refineries, etc.

A further object of the invention is to provide conduit connections which provide a full opening into the conduit or pipe to which the connection is applied, or into the casing or other oil well pipe in the case of well head installations, so that operations within the conduit which require the full interior width of that conduit, can at all times be performed, yet while reducing the area subject to pressure within the conduit to a minimum. It is also an object of the invention to provide designs of conduit connections, whereby the sealing areas of the conduit parts are continuously protected against injury which would impair their sealing effectiveness.

It is an object of the invention to provide for the use of the herein described conduit connections and sealing means therefor, in the drilling and completion of oil wells while maintaining complete mechanical control of the formation pressure, yet providing for the safe removal of the control equipment when its presence on the well head is no longer required. In addition to its application to ordinary pipe connections, the invention involves novel conduit connections and sealing means on and associated with oil well casing and tubing heads and hangers, master drilling valves and blowout preventers and Christmas tree and other well head parts.

Various other objects and advantages of the invention will be apparent, as the description progresses herein.

In the drawings:

Fig. 1 is a side elevational view, partly in section, showing an initial casing head mounted on the well, and attached to the first string of casing.

Fig. 2 is a side elevational view of the well head partly in section, showing control equipment mounted on the casing head, at the time when the drilling operation is to be performed through and below the initial string of casing.

Fig. 8 is an enlarged vertical sectional view, illustrating the novel sealing connection between certain of the well head parts.

Fig. 9 is a vertical sectional view of a novel sealing ring employed in the various connections between the elements of equipment, as disclosed herein.

Figs. 10 and 11 are enlarged vertical sectional views showing the same general design of sealing connection, and particularly illustrating the manner in which the novel sealing ring is altered in shape as it is forced into sealing position between certain of the well head parts.

Fig. 12 is a vertical sectional view, partly in section, of a modified form of the invention, wherein present day standardized control equipment is modified by the attachment of a separate adapter, in order to connect with one of the well head parts, as disclosed herein.

Figure 13:
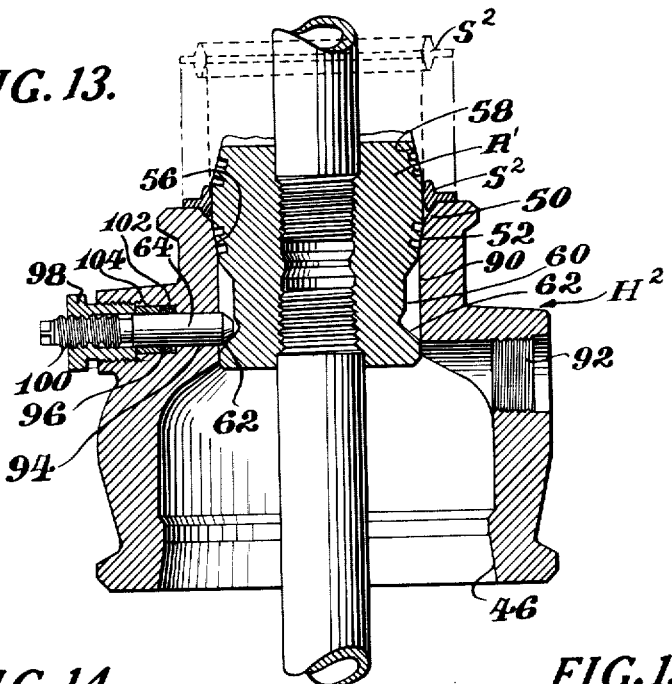

Fig. 13 is an enlarged vertical sectional view of the new design of tubing head and hanger, which forms a part of this invention, showing the manner in which the sealing ring may be removed from the tubing head after the hanger is landed, or again applied to the tubing head around the hanger, in instances where the control equipment is to be again mounted on the well, for operations after the well is completed.

Figure 14:
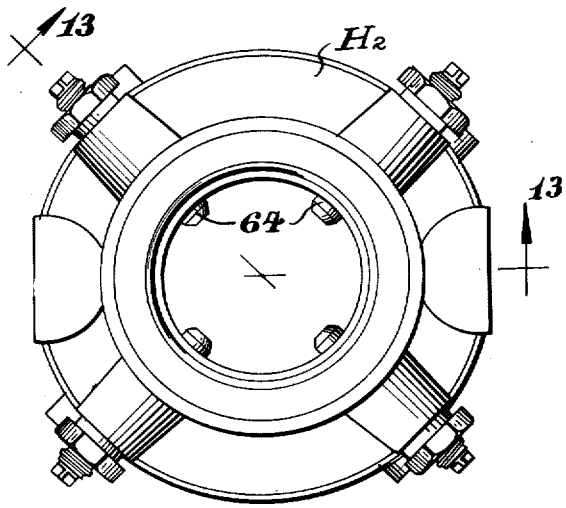
Figure 15:
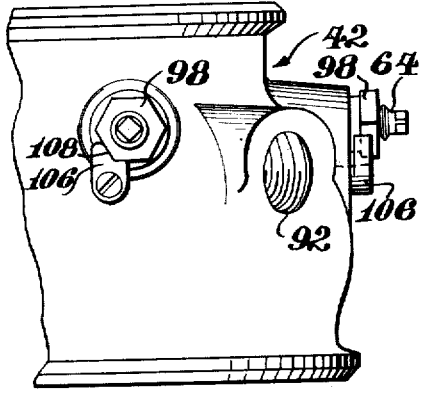

Fig. 14 is a top plan view of the tubing head of Fig. 13 and Fig. 15 is a partial side elevational view of this tubing head.

Fig. 16 is a top plan view of one of the clamping assemblies and Fig. 17 is a vertical sectional view taken along the lines 17—17 of Fig. 16.

Fig. 18 is a side elevational view of the clamping assembly of Fig. 16.

Fig. 19 is a partial vertical sectional view through a well head assembly, illustrating the manner in which another piece of control equipment, a drilling guide and seat protector, may be mounted on and above one of the well head parts.

Fig. 20 is a view similar to Fig. 19, showing the same assembly, with an improved type of drilling guide and seat protector mounted on the well head.

Fig. 21 is a view showing the details of the locking screw assembly which is used in the tubing head.

Fig. 22 is a partial vertical sectional view of a modified casing head assembly, and showing a modified type of connecting clamp.

Fig. 23 is a side elevational view of the connected well head parts, as illustrated in Fig. 22.

It will be understood that the drawings briefly referred to above, are illustrative, and are not intended to restrict the invention to any precise design of equipment. Furthermore, those skilled in the art will appreciate that there may be many variations in the operating procedures described herein, while practicing the invention. In fact, it is a purpose of the invention to provide an assembly of equipment of such flexibility, that it readily adapts itself not only to the usual operations carried out in building a well, but also to unusual operations which may be necessary, in meeting the particular pressure or other condition, which is encountered at a given well. For instance, while the step of "drilling in" is referred to herein, it will be understood that the system may be employed when other equivalent operations for penetrating the pay sands are performed. Again, many well known operations which are involved, incident to building the well, are contemplated in the use of this system, and the system is designed to make possible the convenient performance of these operations, without losing mechanical control of the well at any stage, and without involving the tying up of expensive control equipment as a permanent part of the well head structure. As an example of the above, it is contemplated that the usual casing and tubing seals, such as back pressure valves and the like, may be used when required, and then safely removed in a manner which is well known in the art. It is further contemplated that the usual cementing operations may be performed, between the setting of successive strings of pipe, as is well known in the art, and the system herein described contemplates the safe performance of these operations. Furthermore, while the drawings and description disclose a completion wherein two strings of casing are employed, it will be understood that the system is designed for employment where more than two strings of casing are used. While this application stresses mechanical control of the well, it will be understood that the system will be used where mud control is also present, and the system provides for the presence and proper handling of the mud fluid.

Referring to Fig. 2, a first well casing is shown at 1 and mounted thereon is a first well head part or casing H¹, of novel design as hereinafter described, and as illustrated in Fig. 1. It will be understood that when the first or surface string of casing 1 is inserted into the drilled hole, the casing head H¹ is mounted thereon, and thereafter drilling operations are performed through the casing 1 in preparation for the landing of the next string of casing, as will be subsequently described in connection with Fig. 3. Still referring to Fig. 2, the assembly illustrated includes control equipment mounted above the head H¹, comprising for purposes of illustration a master drilling valve M and a blow-out preventer B, mounted one above the other on the casing head, for use in drilling and while landing the subsequent string of casing. Above the blow-out preventer B, there is a drilling nipple N provided with a suitable side outlet, for use when drilling the well, as is well understood in the art. While we show the control equipment as comprising a master drilling valve of the gate type, and a blow-out preventer of the ram type, it will be understood that other suitable designs of control equipment may be employed. As is well known in the art, the master drilling valve is of such design as to be capable of providing a complete closure across the well opening when there is no pipe therein, whereas the blow-out preventer B has semi-cylindrical shoes capable of sealing around a drill or other pipe, such as a casing, to seal the well and provide mechanical control when there is a pipe in the hole. Of course, this system contemplates the use of two blow-out preventers, if required, during the performance of the drilling and pipe inserting operations disclosed herein.

Referring to Fig. 1, the casing head 1 has a bore 10 which is substantially equal to the interior diameter of the casing 1. This bore terminates at its upper end in an upwardly and outwardly flaring seating area 12, and above this area there is an outer and upwardly tapering or flaring sealing surface 14. The seating area 12 is adapted to receive and support the hanger of the inner pipe, and the sealing surface 14 is adapted to receive and seal with a novel sealing ring, as hereinafter described, when an upper well head part is secured to the casing head. The bowl of the casing head is surrounded by a relatively short connecting flange 16, of special design, and which has a lower upwardly and outwardly tapering wedging surface 18 to engage a similar surface on the connecting clamp C, which is shown in Fig. 8. The lower end of the master drilling valve M is formed with an adapter A (Fig. 2) which has a similar flange 20 presented toward the flange 16, and this flange has an outer downwardly and outwardly tapering wedging surface 22 which is likewise adapted to engage a similar surface on the clamp C, when the latter is employed to connect the control equipment to the casing head H¹. In order to effect a high pressure seal between the parts so connected, we provide a special sealing ring S, of suitable metal, and of design as illustrated in Fig. 9. This special sealing ring has an exterior rib 24 which is positioned between the flanges 16 and 20 as best shown in Fig. 8 and lip portions comprising a lower, downwardly and inwardly tapering sealing surface 26, to engage the sealing surface 14 of Fig. 1, and an upwardly and inwardly tapering sealing surface 28 to engage and seal with a similar inside downwardly and outwardly tapering or flaring sealing surface 30, on the lower end of the adapter A of the blow-out preventer or on any other well head part which is being connected to the casing head H¹.

The sealing ring S has an inside bore which is full opening, when it is clamped in the position shown in Fig. 8. That is, the inside bore 32 of the sealing ring is substantially equal to the inside diameter 34 of the adapter or other well head part A (Fig. 8) and this bore 32 is substantially equal to the maximum diameter of the seating area 12, which receives the casing hanger, as hereinafter described. The clamp C comprises two or more semi-circular parts, which are clamped together by lateral bolts 35, as generally indicated in Fig. 2, and when these parts of the clamp are drawn toward one another, their inside wedging surfaces 36 and 38 (Fig. 8) act upon the correspondingly tapered surfaces 22 and 18 of the well head parts, to draw said well head parts toward one another. When the well head parts are thus drawn toward one another, their sealing surfaces 30 and 14 are tightened against the respective exterior tapering surfaces 28 and 26 of the sealing ring, to effect a high pressure seal between the well head parts, and on the inside thereof, so that the pressure subject area is reduced substantially to the interior diameter 34 of the adapter A, when the clamp C is tightened, all as hereinafter described in more detail. By reason of the full inside diameter of the sealing ring S, seating area 12 of the casing head H¹ is left exposed, whereby a hanger for the inner string of pipe may be lowered through the control equipment to its permanent seat 12, while mechanical control of the well is maintained. Thus, the construction provides an effective seal against extremely high pressures, between the well head parts, yet permitting the passing of the hanger through the control equipment to its seat, while maintaining a minimum pressure area seal and without disconnecting the control equipment from the well head. The construction and operation of the sealing ring is described in more detail later in this specification.

Referring again to Fig. 2, the master drilling valve M is shown attached to the blow-out preventer B by a similar sealing connection including the clamp C¹, and sealing ring S¹, the latter being formed with the exterior rib and tapering sealing surfaces, and with a full opening therethrough when the clamping connection is completed as heretofore described, so that the hanger may pass through the control equipment as previously referred to. A similar connection including the parts just described, is provided between the blow-out preventer B and the drilling nipple N, or other well head part which may be mounted above the blow-out preventer. In each instance, it will be understood that the well head parts so connected, are provided with tapering sealing surfaces corresponding with surfaces 14 and 30 of Fig. 8, and outside wedging surfaces 18 and 22 of Fig. 8, in order to provide for the high pressure connection, as previously described.

With the parts assembled as in Fig. 2, the well may be drilled through the casing 1, with the mechanical control equipment available for use, a drilling bit D on a drilling string 40 being illustrated for this purpose.

Of course, the drilling through and below the first casing 1 may be performed to substantially the full interior diameter of the casing 1, and using conventional mud circulation methods, the mud being discharged at the surface, through the suitable outlets as shown, in the usual manner. While the head of mud in the well will be relied upon to control the pressures, mechanical control of the well is available by reason of the presence of the control equipment, as referred to. Furthermore, the high pressure sealing connections, as described, are present between all of the connected parts, so that in the event that it is necessary to close one or more of the blow-out preventers, extremely high pressures may be effectively controlled.

After the drilling operation is completed, and keeping in mind that other operations at this stage of the procedure may likewise be performed, the drill string and bit are removed, and when the bit is elevated above the master drilling valve M, that valve may be closed to seal the well, is this is necessary.

Figure 3:
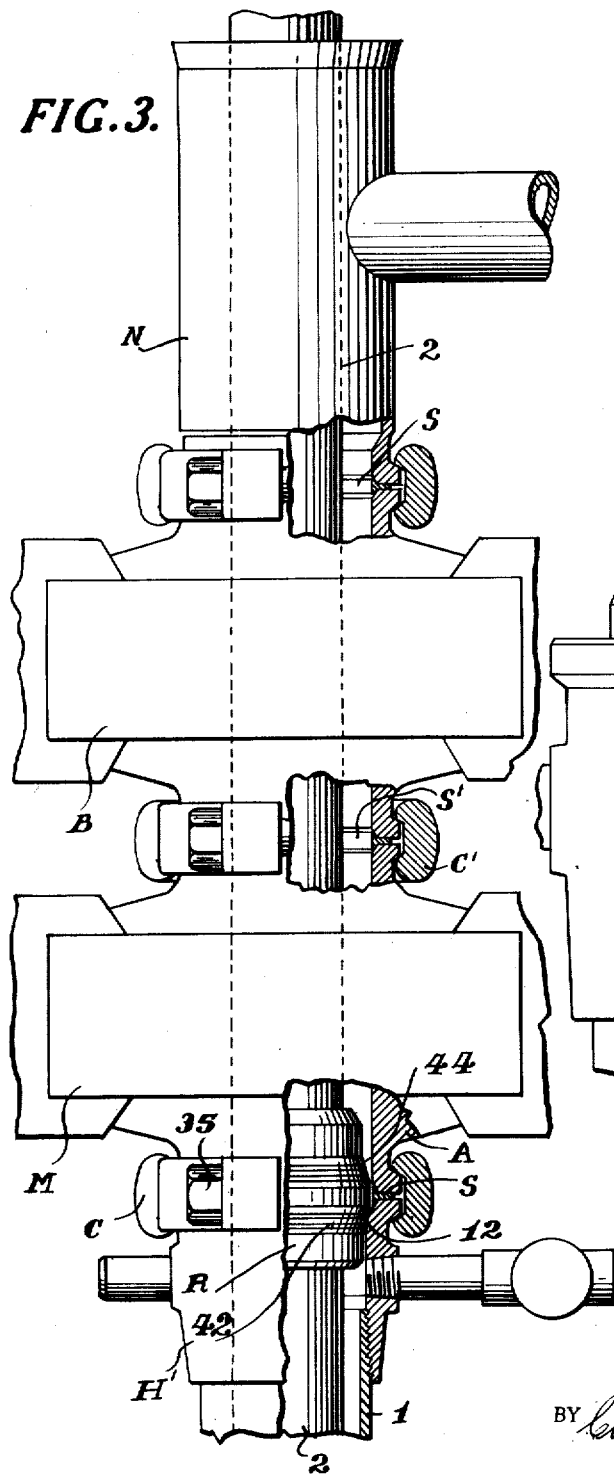
Fig. 3 is a view similar to Fig. 2, showing a succeeding operation, wherein a casing is being lowered and landed in the casing head, while maintaining mechanical control of the well.

In Fig. 3, a necessary step in the building of the well is illustrated, the same being the running and landing of the second string of casing 2. When this casing is inserted into the well, it will be understood that the rams of the blow-out preventer B will have been changed to the larger or casing size, as compared with the smaller or drill pipe size of rams, which were used in the drilling procedure illustrated in Fig. 2. When the casing has been lowered to the proper depth in the drilled hole, a casing hanger R is applied to the upper end of this casing, and this hanger is of such diameter that it will pass through the control equipment and land on the seating area 12 of the casing head H¹. By reason of the fact that the sealing ring S in the casing head H¹ has a full bore, the seating area 12 is left exposed, so that the hanger may be lowered through the sealing ring S in the head H¹ to its seat 12. The hanger R may vary in design, but it is of that type which has a lower downwardly and inwardly tapered seating surface 42 and an upwardly and inwardly sealing surface 44. The seating area 42 is of a taper corresponding with the area 12 of the casing head H¹, so that when the hanger is landed in the seat, an effective seal is provided under the weight of the long string of casing which is carried by the hanger.

Figure 4:
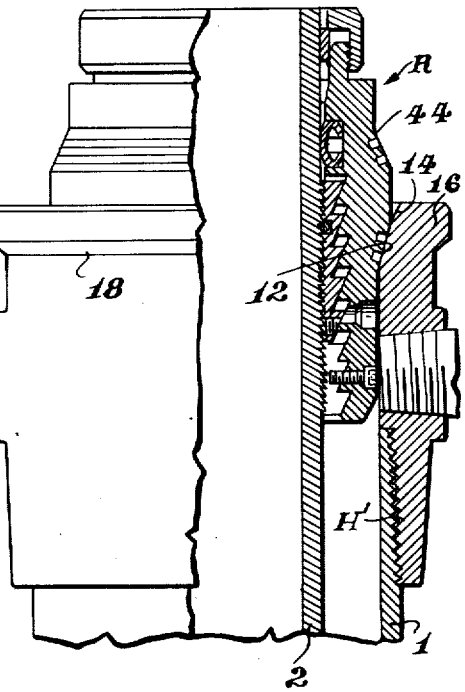
Fig. 4 is a side elevational view, partly in section, showing the condition of the equipment after the casing has been landed, and with the control equipment removed.

As indicated above, casing hangers of various types may be employed, although we prefer that these hangers should be of the double tapered type, as far as exterior configuration is concerned. For instance it may be of the type which is threaded to sections of the casing 2, interiorly, both at its upper and lower ends, or the hanger may be of the well known slip type, which may be welded to the casing at its upper end, after the hanger is landed, and after the tension on the pipe is adjusted, by moving the casing relatively to the hanger. The hanger may also be of the slip type, which is provided with means for cold rolling the upper end of the casing against the interior wall of the hanger, as hereinafter referred to, or a type of casing hanger as illustrated in Fig. 4, which relies on a tapered seal box and seal at the top of the hanger, to make the seal between the bore of the hanger and the outer wall of the casing. While we particularly refer to the use of a casing hanger of the double tapered type, it will be understood that the present invention, including the clamping assembly and novel sealing ring, may be used in association with other designs of hangers, and which may not be of the double tapered type.

Prior to the landing of the hangar R, the pressure subject area at the casing head H¹ may be said to be that defined by the interior diameter of the sealing ring S which is positioned in the casing head H¹, as shown in Fig. 3. When the hanger is landed, this pressure subject area is reduced by reason of the sealing contact of the lower taper 42 on the hanger, against the seating area 12 of the casing head. It will be understood that the exterior tapering surfaces 42 and 44 of the hanger are provided with grooves and circular rings of hydraulic packing material, as is now well understood in the art.

Figure 6:
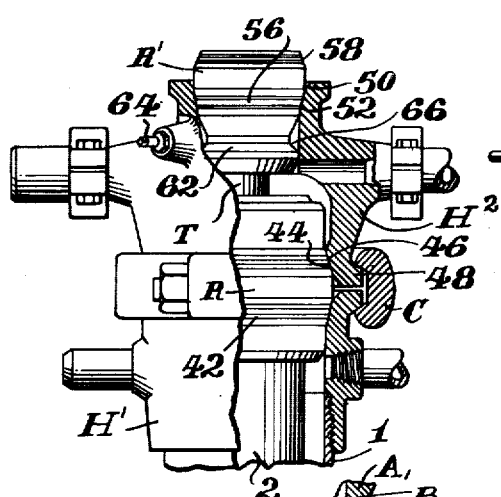
Fig. 6 is a similar view, showing the condition of equipment when the tubing has been landed, and when the control equipment has been removed.

After the landing of the hanger, the control equipment may be removed, at which time a second well head part is placed on the casing H¹, in substitution for the master drilling valve M with its adapter A. If another string of casing is to be landed, another casing head may be mounted on and above the casing head H¹, but for purposes of simplification, we have used for illustration, a procedure wherein only two strings of casing are landed, and therefore we show in the drawings the mounting of a tubing head H² on and above the initial casing head H¹, as illustrated in Fig. 6.

Prior to the mounting of the second casing head, or the tubing head, on and above the lower casing head H¹, and after the removal of the control equipment, the well head will be in the condition as illustrated in Fig. 4, it being noted that the sealing ring S which is shown in the head H¹ in Fig. 3, has been removed, and that the upper outer tapered surface 44 of the hanger R is exposed above the top of the lower casing head H¹. The second casing head or tubing head has at the bottom of its bore a downwardly and outwardly tapering or flaring sealing surface 46, of configuration corresponding with the upper taper 44 on the hanger R. It also has a lower flange 48, with an outside wedging surface, corresponding with the surface 22 of the adapter A, as previously referred to. Accordingly, when the tubing head H² is mounted above the head H¹, after the hanger R is landed, and when a clamp C is applied, as previously referred to, the upper head H² is wedged downwardly toward the lower head H¹ and a high pressure seal is formed between the taper 44 of the hanger and the inside tapered surface 46 of the upper or tubing head H². Thus, the pressure subject area is reduced to the minimum diameter of this seal, as far as the action of pressure within the inner casing 2 is concerned.

Figure 5:
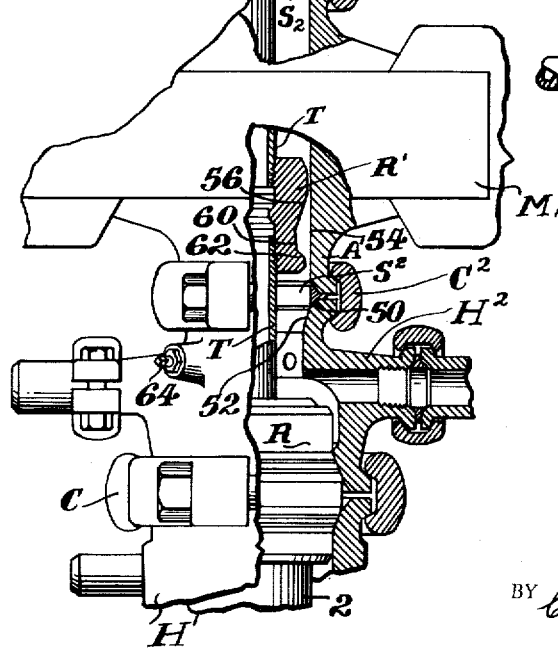
Fig. 5 is a similar side elevational view, partly in section, illustrating a subsequent step in the completion of the well, when the well has been "drilled in" or similarly prepared for flowing, the view showing the final phase of the operation of running the tubing through control equipment, with the tubing hanger at a position it occupies just before it is landed and locked in the tubing head.

After the tubing head H² is thus mounted and connected by the high pressure clamp as described, control equipment suitable for the next operation may be mounted on and above the head H². In Fig. 5, we show this control equipment as including a master drilling valve M¹, and a blow-out preventer A' as described, and of design to clamp to the upper end of the tubing head as shown in Fig. 5, using the clamp C² and the sealing ring S² of the same design as previously described. The tubing head H², like the casing head H¹, has a bowl comprising an upwardly and outwardly flaring sealing surface 50, corresponding with the surface 14 of casing head H¹ (Fig. 8) and an inner and lower seating area 52 corresponding with the seating area 12 of the head H¹, likewise as shown in Fig. 8. When the control equipment is mounted on and above the head H², and with the high pressure seal effected by the sealing ring S² and the clamp C², as previously described, the seating area 52 is left exposed, for the landing of the tubing hanger, as shown in Fig. 6, and as will be hereinafter described. It will also be understood that the sealing ring S² used on the sealing surface 50 of the tubing head H², as shown in Fig. 5, is of the full bore design, having an inside diameter at least as large as the bore 54 through the control equipment which is mounted above the head H².

While we show the operation of landing the tubing hanger, in Fig. 5, it will be understood that all of the necessary completion operations will be performed through the tubing head H² and its control equipment, prior to the landing of the tubing and its hanger. For instance, "drilling in" and the allied operations, as known in the art, may be performed while maintaining the well under complete mechanical control with the well head equipment erected as shown in Fig. 5. That is, drilling in and similar operations may be performed through the master drilling valve, and blow-out preventers, the full bore of the casing 2, being available for these operations, by reason of the design of the equipment as described. Of course, when we used the term "drilling in," we contemplate not only penetrating the pay sands with a drilling bit, but also any equivalent operations for penetrating the pay sands, as are well understood in the art.

After the completion operations as just referred to have been performed, the tubing may be landed with mechanical control, through the control equipment, as illustrated in Figs. 5 and 6. The tubing T is shown in Fig. 5 equipped with a tubing hanger R¹ of novel design, the said hanger having a lower tapered seating area 56 of design to land on and seal with the tapered seating area 52 of the tubing head H², and an upper tapered sealing surface 58 which protrudes above the upper end of the tubing head, when the hanger is landed. As disclosed in Fig. 5 the lower exterior part of the hanger R¹ is reduced as at 60, providing a locking shoulder 62, and the tubing head has a plurality of spaced pressure-proof locking screws 64 extending laterally therethrough, so that when the hanger is landed, as shown in Fig. 6, these locking screws may be projected inwardly so that their inner ends engage against and above the shoulder 62 on the hanger, to lock the hanger downwardly against well pressure which might be great enough to lift the hanger and the pipe which it suspends. The inner end of one of the locking screws for holding the hanger in its seat, is indicated at 66 in Fig. 6.

It will be noted that the hanger seating area 52 of the tubing head H² is located closely adjacent to the upper end of the tubing head, whereby it is possible to better protect this seat, by the use of a drilling guide, or the like, as hereinafter described. Furthermore, the overall height, thickness and weight of the parts is reduced, by having the pressure-proof locking screws 64 disposed in a plane spaced below the upper end of the tubing head, these locking screws engaging a shoulder on the hanger near the lower end of the hanger as previously described, rather than engaging the hanger at the upper end thereof as was common in prior art constructions.

We disclose a hanger of the type wherein sections of the tubing T are threaded into the upper and lower ends of the bore of the hanger R¹. It will be understood that other designs of hanger may be employed, as far as the internal manner of engaging or connecting with the tubing is concerned. For instance, a hanger of the stuffing box design may be employed, whereby it is possible to adjust the tubing with respect to the hanger, incident to completion operations, all in a manner as will be hereinafter referred to.

After the hanger R¹ is landed and locked, the control equipment may be removed, and the Christmas tree or flow connections for use during the flow life of the well, may be attached. It will be understood that this system of well control, contemplates complete mechanical control during the tubing operations, such as the use of removable back pressure valves within the tubing, or within the hanger or adjacent thereto, as hereinafter referred to.

Figure 7:
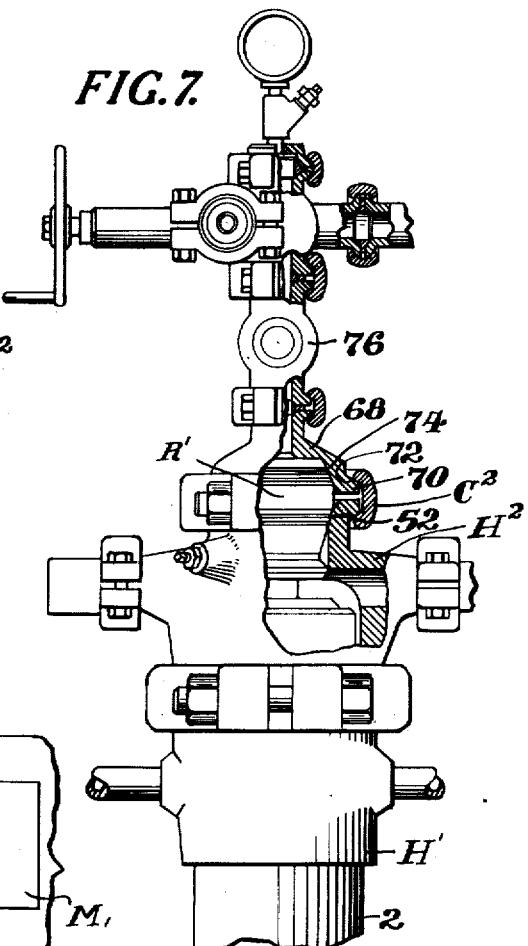
Fig. 7 is a similar side elevational view, partly in section, showing the well at the time it is completed, with the Christmas tree mounted on and above the tubing head. This view illustrates the well in condition for flowing.

After the tubing hanger is landed and locked, the Christmas tree is attached, as shown in Fig. 7. The lower end of the Christmas tree, shown as an adapter 68, comprises another well head part adapted to employ the high pressure clamping connection, as previously described. It has a lower exterior flange 70 with a downwardly and outwardly tapered wedging surface 72, in order to cooperate with one of the clamps C², which likewise engages the exterior wedging surface on the upper flange of the tubing head H². The Christmas tree cap or adapter 68 also has an inside downwardly and outwardly tapered sealing surface 74, of such design as to seal with the upper exterior tapered surface 58 on the tubing hanger R¹. Accordingly, when the Christmas tree cap or adapter 68 is mounted, and clamped by one of the clamps C², there is a seal formed against the exterior surface 58 of the hanger, thus reducing the pressure subject area, as far as pressure from within the tubing is concerned, to a diameter less than that of the sealing ring S² used in the tubing head during the running of the tubing, as illustrated in Fig. 5. The Christmas tree cap has connected thereto, and above the same, the usual Christmas tree valves and fittings, including the master manifold valve 76, and the various other fittings, as shown in Fig. 7. It will be noted that the high pressure clamp design, including the clamp and sealing rings, and associated tapered parts, both within and on the outside of the fittings, are employed throughout the various Christmas tree connections.

While we disclose herein a novel double tapered tubing hanger, it will be understood that the novel clamping assembly and sealing ring of this invention may be employed in association with other types of tubing hangers, such as those which are not provided with the extension, which protrudes above the upper end of the tubing head. When used with such hangers, the sealing ring would be left in place, and would be employed to make a seal with the Christmas tree cap or adapter, in a manner which will be obvious from the description given above. That is to say, the sealing ring can be employed to form the high pressure connection with the Christmas tree cap, just as it is employed in making such a sealing connection with control equipment, when mounted on the tubing head.

After the well is completed, as described above, it is possible to re-enter the well and perform any operations as may be required, without losing mechanical control of the well. For instance, the tubing may be plugged through the Christmas tree in a manner well known in the art, after which the Christmas tree may be removed and the control equipment shown in Fig. 5 may be re-installed. Thereafter, the tubing hanger may be elevated, and the tubing may be removed for performance of further drilling or similar operations, or the tubing may be lengthened or shortened, after which the tubing may again be landed with its hanger, and the Christmas tree re-installed, all while maintaining mechanical control of the well. Of course, when the control equipment is again installed, it may be connected to the upper flange of the tubing head, using one of the sealing rings S², as shown in Fig. 5. That is, when the Christmas tree cap is removed, the sealing ring may be passed downwardly over the hanger, and positioned in the sealing surface 50 of the head H², after which the control equipment may be clamped on to the head H² and in high pressure sealing engagement therewith, before the pressure-proof locking screws are released to elevate the hanger, all of this being possible by reason of the fact that the inside diameter of the sealing ring which is employed, is greater than the maximum outside diameter of the hanger R¹. Of course, the same conditions exist with respect to the casing operations. For instance, and referring to Fig. 4, it will be understood that a sealing ring of the design described herein, may be inserted downwardly over the hanger R, and into the sealing surface 14, and the control equipment thereafter attached, before elevating the hanger R from its seat, in case such an operation should be found to be necessary.

In summary, the novel sealing ring and associated parts are such that the various hangers may be landed through the sealing ring, with control equipment present on the well, and also, the sealing ring may be inserted downwardly over the hanger when the control equipment is absent, in preparation for re-attaching the control equipment. At the same time, pressure subject areas are kept at a minimum, throughout all of these operations, as referred to.

While we have emphasized procedures wherein the sealing ring is removed after the hanger is landed through the control equipment, it will be understood that the sealing ring may be left in place and used to form a seal with the substitute well head part, such as a second or upper casing or tubing head, if desired. In particular, the sealing ring will be left in place and so used when hangers are employed which do not have the upper sealing surface.

Throughout Figs. 1 through 9, the adapters on the control equipment are shown as being formed integrally thereon, with the proper design of connection to cooperate in the high pressure clamping assembly which has been described. It is recognized, however, that present day control equipment is standardized, with a ring joint flange of design approved by the American Petroleum Institute. In order to practice the present invention with such now standard equipment, the connecting adapter on the control equipment may be a separate part $A^2$, as illustrated in Fig. 12. This adapter is shown provided with an upper flange of the standard ring joint type, as indicated at 78, to connect with the standard flange 80 of a master drilling valve or blow-out preventer. The lower end of this adapter $A^2$ is suitably formed, as shown, and as previously described herein, to receive the sealing ring S and to be connected by the clamp C, as previously referred to. Of course, the casing head $H^1$, or any other casing head or tubing head employed in such a combination, will have a bowl with an outer sealing surface, and an inner seating area which is left exposed for the landing of a hanger, when the control equipment is mounted on and above the head. The adapter $A^2$, like the integral adapters on the control equipment as previously described, will have an inside diameter at least as large as the maximum diameter of the seating area for the hanger, and the inside diameter of the sealing ring will be substantially equal to that of the inside diameter of the adapter. It will be understood that such a separate adapter for the control equipment may be employed on the control equipment mounted on the tubing head $H^2$, the assembly of Fig. 5, for instance, being modified in the same manner as portrayed in Fig. 12, and as will be obvious to those skilled in the art.

Fig. 13 comprises an enlarged view of a tubing head $H^2$, of substantially the same design as that shown in Fig. 5. This tubing head has a bore 90 which is full opening, in the sense that it is substantially as large as the interior diameter of the last casing, on which the head $H^2$ is mounted. At the upper end of this bore, there is the inner seating area 52 and the outer sealing surface 50, of design and for the purposes previously described. The hanger $R^1$ is likewise of the design previously described, having an outside tapered seating area 56 and an upper sealing surface 58 which extends above the top of the head $H^1$, when the hanger is landed, as previously described. Likewise, as already referred to, the hanger is reduced near its lower end, as at 60, and is exteriorly recessed to provide a shoulder 62 whereby the hanger and the tubing which it supports, may be locked down by the locking screws 64. The head $H^2$ has the usual side outlet 92, which may be of conventional design, or it may be of the design shown in Fig. 5, wherein the side outlet is shown of a design to employ one of the novel clamping assemblies, as described herein, including the clamp and sealing ring, for the attachment of a side outlet pipe, leading from the tubing head. Of course, it will be understood that any of the casing heads referred to herein, such as $H^1$, may be similarly provided with such a special design of side outlet, as just described.

Extending through the side wall of the head $H^2$, at equally spaced points, are a plurality of openings 94, as shown in Fig. 13, the outer ends of these openings being counter-bored as at 96 in order to receive the locking screw assembly. The locking screw assembly includes an adjustable collar 98, which is exteriorly threaded, as shown, to engage similar threads in the counterbore 96. The locking screw 64, in turn, is threaded as at 100, to engage interior threads in the collar 98. The inner part of the counterbore may be provided with suitable packing, which is tightened by the threading of the collar 98, and we show for this purpose a ring of packing material 102 and a follower for this packing, designated by the numeral 104. The outer end of the collar 98, and the outer end of the locking screw 64, are suitably designed to receive a wrench, whereby the locking screws may be moved inwardly or retracted, as desired, while providing a tight seal, and control against any escape of fluid under pressure through the openings 94. In Fig. 13, one of the locking screws 64 is shown in its inner position, where it engages the shoulder 62 on the hanger, to lock the hanger in its seat. When retracted, the locking screws will be withdrawn entirely from the bore of the head $H^2$, to permit insertion of tools through the bore 90, and utilizing the entire width of this bore. As shown in Fig. 15, a latch 106 may be pivotally mounted on the outer surface of the head $H^2$, said latch having inner surfaces 108 formed to engage against the flat wrench surfaces of the collar 98, to lock this collar in its adjusted position. Of course, it will be understood that the collar 98 serves to tighten the packing, so that it seals against the outer wall of the counterbore 96, against the inner end wall of this counterbore, and against the outer surface of the locking screws 64.

In the design of Fig. 13, it will be noted that the hanger seat, or seating area 52, is closely adjacent to the top of the head, while the locking screws 64 are displaced downwardly a substantial distance below the upper end of the head, and below the hanger seat 52, as distinguished from prior art designs, where the locking screws are positioned to extend through the top flange of the tubing head. This design places the hanger seat at a position where it may be more fully protected, during the course of operation in the wall.

As previously described, the sealing ring $S^2$ shown in Fig. 13 is of the full opening type, having a bore at least as large as the maximum diameter of the seating area 52, and slightly larger than the maximum outside diameter of the hanger $R^1$. Accordingly, when the hanger is landed through control equipment, as indicated in Figs. 5 and 6, it will pass through the sealing rings $S^2$, after which the control equipment and the sealing ring may be removed. The well would then be completed in the manner illustrated in Fig. 7. If it should become necessary to re-enter the well, the Christmas tree can be removed, after closing the tubing, if necessary, with any suitable type of plug, and with the hanger still locked in its seat, the sealing ring may be passed downwardly over the hanger $R^1$ to rest in the sealing surface 50, after which the control equipment may again be applied, for subsequent operations in the well, which may involve the elevation and removal of the hanger $R^1$.

It is well known that the petroleum industry now employs, as a pressure type connection between well head parts, the conventional ring joint flange as standardized by the American Petroleum Institute. As increased well pressures are met, the trend in the industry has been to meet these higher pressures with heavier rings in the ring joint flange, and with larger bolts and thicker flanges. As the thickness of a metal section increases, its average strength decreases, and this, together with the large and cumbersome size which will evolve from such attempts to meet the problem, has brought about a situation where the practical limit of utility is being reached as far as the use of this conventional and standardized equipment is concerned.

In addition, the conventional American Petroleum Institute flange union has the following disadvantages which are avoided by the present invention: (a) great force must be developed to deform the conventional steel ring in order to form an effective seal, and this force is far in excess of the fluid load which is subsequently encountered; (b) a great number of bolts must be employed to gain an even bearing on the conventional ring gasket now employed, thus materially increasing the number of necessary parts; (c) in employing the conventional union, as referred to, a bolt head clearance must be allowed for, thus enlarging the outside diameter of the conventional flange, as well as its bolt circle; (d) because the inside of the conventional ring grooves must be of considerable strength to withstand the great crushing force which is employed, minimum pressure subject areas cannot be obtained; and (e) because the bolt circle of the conventional union is necessarily greater than the ring gasket diameter, a lever arm exists, which with the great force necessary to complete the union, as previously referred to, creates a very substantial bending moment, thus necessitating a considerable increase in the flange thickness.

The increase in flange thickness which is necessary if the conventional union is to be employed, against present high pressures, produces the following undesirable effects: (a) the strength of the metal within the thick sections is reduced; (b) a sudden and undesirable section change in the wall of the casting results; (c) the casting is bulky and unhandy and expensive to pour and to machine; and (d) undesirable height is added to the union, which increases the length of the pieces of equipment with which it is used. Referring to Figs. 10 and 11, the novel sealing ring S comprises an inner, continuous, annular flange portion 110, and an integral, continuous and annular supporting and strengthening rib 24. The flange portion 110 includes oppositely extending lip portions 111 and 112. The sealing ring is preferably made of elastic steel, at least, the lip portions are sufficiently elastic so that they may be bent inwardly, within the elastic limit of the metal, from the position of Fig. 10 to that of Fig. 11, when the clamp draws the flanges of the well head parts being joined, toward one another. While we prefer that the sealing ring be made of an elastic hard metal, such as steel, the ring might be made of softer metals, such as brass, or even of suitable plastics, such as Bakelite. However, the elastic steel is preferred, so that when the lips are bent inwardly within the elastic limit of the metal, they will return to their normal position of Fig. 10 when the force is removed, so that a particular sealing ring may be re-used.

Fig. 10 illustrates the situation which exists, for instance, when the sealing ring is placed on a flange 16, of one well head part, in preparation for the completion of the union by drawing the flange 20 of the other well head part, toward the flange 16. When the parts are so positioned, the clamping assembly C is applied to the flanges 20 and 16 (as will be apparent from an observation of Fig. 8), and when the nuts of the clamping assembly (shown at 138 in Fig. 16), are hand-tightened, initial contact is made at points A at the outer ends of the lips 111 and 112, respectively, against the sealing surfaces 30 and 14 of the well head parts being connected. Referring to Fig. 10, it will be noted that the acute angle between the horizontal center line of the rib 24 and the outer sealing surfaces 28 and 26 of each of the lips, is somewhat greater than the acute angle between this center line and the sealing surfaces 30 and 14 of the well head parts. On the other hand, the corner points B on the well head parts, at the outer ends of their sealing surfaces, are in longitudinal alignment with the corner points C on the sealing ring where the sealing surfaces 28 and 26 of the sealing ring join with the flat surfaces F of its rib 24. Accordingly, when the well head parts are drawn toward one another by the clamping assembly, the angle formed at the points A between the sealing surfaces becomes progressively more acute, up to the point when the flanges 20 and 16 are brought to a stop when they engage the flat surfaces of the ribs 24, at which time the pairs of sealing surfaces 30 and 28, and 14 and 26, are parallel with and flush against one another, as shown in Fig. 11. Thus, as the seal is completed, lip portions 111 and 112 are flexed inwardly around pivot points in the flange portion 110 of the sealing ring, which pivot points are somewhere in the neighborhood of the base ends of the sealing lips, adjacent to the corner points C. In the design of the sealing ring shown in Figs. 10 and 11, the inner faces 113 and 114 of the sealing lips 111 and 112, respectively, are formed to taper outwardly to a slight extent, from the central inner surface of the flange 110, when the sealing ring is in its normal or un-clamped condition. The degree of inward bending of the sealing lips, as a result of the clamping action, is indicated in Fig. 11, where it will be observed that the inner face of the flange 110 of the sealing ring is substantially straight throughout its entire length.

Thus, when the clamp is tightened from its hand-tight position of Fig. 10 to the final position of Fig. 11, the lips 111 and 112 are deflected inwardly. Because this deflection is within the elastic limit of the material, energy is stored in the lips and they place themselves tightly against the sealing surfaces 30 and 14 of the well head parts. When the clamp is fully set up, as illustrated in Fig. 11, the sealing surfaces of the lips are tight and sealingly engaged with the corresponding sealing surfaces on the well head parts, and thereafter, when the union is subjected to pressure, this pressure is exerted outwardly against the inner face of the flange 110 of the sealing ring, to make the sealing action more effective. It will be understood that only a moderate force will be required, exerted on the nuts 138 of the clamping assembly (see Fig. 16), in order to deflect the sealing lips 111 and 112 inwardly to the position illustrated in Fig. 11; yet, the union is a completely effective one, because the pressure subject area is substantially reduced and the pressure acts against the flange 110 of the sealing ring, to increase the effectiveness of the seal thus formed. With the construction as illustrated, the attendant will always know when he has properly tightened the nuts of the clamping assembly, for it is only necessary that he tighten them until the tightening action is stopped, by the contact of the inner surfaces of the flanges 20 and 16 against the flat faces F of the rib 24 of the sealing ring, as shown in Fig. 11. Furthermore, it is not possible for the attendant to set up on the nuts of the clamping assembly, to a point where the sealing ring would be crushed, for the rib 24 provides a definite stop against excessive tightening. As previously stated, the sealing ring is of such design that when properly clamped, as illustrated in Fig. 11, there is a bore available through the interior of the sealing ring, equal to the maximum bore of the well head parts being connected, as is illustrated, for instance, in Fig. 2, while maintaining minimum pressure subject area. The rib 24 of the sealing ring is of such design that it maintains a constant diameter, and is not drawn inwardly during the clamping action, the only movement of the sealing ring being the inward bending of the lips thereof, as previously described. When the union is tightened, as illustrated in Fig. 11, the flanges of the well head parts contact the sealing ring tightly against the flat faces of the rib, and against the outer surfaces of the sealing lips, whereby a substantially unitary structure results, the strength of the metal of the well head parts serving to back up the sealing ring, whereby extremely high pressures may be withstood. The rib 24 of the sealing ring is of sufficient size to provide increased strength, in order to resist any bursting tendency at the union caused by high fluid pressure which is being handled. It will be observed that the sealing ring is of symmetrical design, so that it is self-aligning when placed in position between the well head parts which are being connected.

It will be observed that the high pressure union employing the novel sealing ring and associated parts, described above, presents the following advantages:

(a) A minimum pressure area seal is effected.

(b) A full bore through the well head parts is provided, without sacrificing the minimum pressure area seal.

(c) The rib on the sealing ring affords rigidity, which is necessary both in handling the sealing ring and in preventing excessive crushing during its use, and without sacrificing the full bore or minimum pressure area, as referred to.

(d) The metal of the well head parts being connected, serves to back up the sealing ring outwardly of its lips, and the rib of the sealing ring provides added strength to resist any bursting tendency which would be caused by the high fluid pressures being controlled.

(e) Because the inner surfaces of the well head parts contact the outer surfaces of the rib of the sealing ring, a very rigid union results, and a constant spacing of the inner surfaces of the flanges of the well head part is assured.

(f) The design of the lips of the sealing ring makes it possible for the pressure within the union to aid in the sealing action, while the rib gives the sealing ring the necessary body to maintain rigidity.

(g) The sealing ring is self-aligning, both angularly and concentrically, when positioned between the well head parts and clamped thereby.

The union as described above, including the split clamp, as shown in detail in Figs. 16, 17 and 18, eliminates the ring gasket of the conventional ring joint flange. Thus, the necessity for the application of excessive sealing force is eliminated, and when the union of the present invention is effected, either against the double tapered sealing ring, or against a double tapered hanger, as described herein, the area subjected to pressure at the union, in each case, is kept at a minimum, whereby the force required to effect the seal is materially reduced. The excessive flange thickness required with the conventional ring joint is unnecessary, because in addition to reducing the force required, the clamp applies its force quite close to the body of the union, eliminating the excessive bending moments in the flanges. Furthermore, no excessive thick sections in the flanges of the well head parts are necessary, and there are therefore no sudden changes in section thicknesses, as is the case with the conventional ring joint flange design. The number of bolts to effect the union is reduced to two, and the union may be completed with greater speed. After the union of the present invention has been made against high pressure, it can be separated or broken rapidly, and the parts can be used repeatedly. Because of the relatively small and economic size of the parts, the union can be designed for high pressure but used for low pressures as well, thus avoiding the necessity for duplicating equipment on hand, in order to provide special designs for various pressure conditions.

In view of the above, the possible encountering of unexpected higher pressures at a particular operation does not have to be considered in the selection of the original equipment for use on a well. Unexpected high pressures will not cause equipment failure.

Referring to Figs. 16 through 18, the clamping assembly is shown as comprising two substantially semicircular elements 128 and 130, of interior design and provided with the interior wedging surfaces 36 and 38, as previously described. Each of the wedging elements is provided with locking extensions 132 having opposed openings 134 extending therethrough to receive the locking bolts 136. The locking bolts are threaded, and provided with nuts 138, which may be tightened to pull the elements 128 and 130 toward one another, to complete the clamping action. When the elements 128 and 130 are drawn toward one another, the interior wedging surfaces 36 and 38 act upon the corresponding wedging surfaces of the well head parts being connected together, to draw these parts toward one another. The well head parts when thus drawn uniformly toward one another, in turn wedge against the tapered surfaces of the sealing element, or of the particular hanger, as the case may be, to effect a high pressure seal.

Fig. 16 indicates a condition of the clamping elements 128 and 130, with respect to one another, when the clamp is tightened to connect adjacent well head parts together. The design of these elements, and of the corresponding well head parts, is such that when the clamp is tightened, the inner surfaces of the elements 128 and 130 do not contact one another, but rather they are separated from one another a substantial distance, leaving an open space 131 between them. Stated otherwise, the elements 128 and 130, and the parts which cooperate therewith, are so designed that the inner faces of these elements will not contact one another to limit the degree to which the nuts 138 may be tightened on the bolts 136.

Referring to Fig. 16, it will be understood that the inner faces of the segments 128 and 130 of the clamping assembly, do not contact one another when the flanges of the well head parts contact the outer surfaces of the rib 24 of the sealing ring, as shown in Fig. 11. The distance which the well-head parts must move, from the position of Fig. 10 to that of Fig. 11, is relatively short, and for this reason, the make-up of the union is rapid, and it is a simple matter to apply and tighten the clamping assembly.

While I have shown a clamping assembly as comprising only two elements, 128 and 130, it is obvious that the assembly may be composed of more than two of such elements.

Fig. 19 is a view similar to Fig. 5, but showing a drill guide and seat protector unit G connected in accordance with this invention, between the tubing head $H^2$ and the control equipment $M^1$. This view illustrates the manner in which the hanger seat 52, disposed as it is near the top of the tubing head, may be protected against injury by the drilling guide unit G. This drilling guide unit is that which is disclosed in the copending application of Robert L. Crain, Serial No. 727,826, entitled "Protector for Oil Well Equipment," filed February 11, 1947, now U. S. Patent 2,638,169, issued May 12, 1953.

Fig. 20 is a similar view, showing the intermediate mounting, between the tubing and casing head and the control equipment, of a different type of drilling guide and seat protector $G^1$, which forms no part of this invention.

These drilling guides are usually mounted above the tubing heads as shown, but obviously they may be of design and size to be mounted above a casing head, for the same purpose. In any event, they are provided with adapter connections with flanges designed for application of the novel connecting clamp assembly, as described herein.

Referring to Fig. 22, a modified arrangement for connecting casing head or other well head parts, employing the invention, is disclosed. In this view, there is a lower casing head part 140 which is interiorly designed, as previously described, including the inner seating area, for a hanger, and the outer sealing surface, for the novel sealing ring, as described herein. In this view, a hanger 142 is shown landed in the casing head 140, and the upper casing head or well head part 144 is provided with an adapter 146 with an exterior wedging surface, to cooperate with a similar wedging surface on a modified type of clamp 148, as previously described. However, the casing head 140 is provided with flights of relatively heavy threads 150, in place of the wedging surface previously described, i. e., and for instance, in place of the wedging surface 18 of the embodiment of Fig. 8, as described above. The clamp 148 is interiorly threaded with relatively heavy threads 152, in place of the lower inner clamping surface of the preferred form of clamp, i. e., in place of the clamping surface 38 of the clamp C, shown in Fig. 8. Otherwise, the clamp 148 is similar in design to the clamp previously described, being in two or more parts, which are drawn toward one another by the bolts 136, as illustrated in Fig. 23. This modified clamping arrangement may be found to be convenient, in some instances, in that it will permit more rapid tightening of the clamp, in order to secure the well head parts in sealing engagement. For instance, when the upper casing head 144 is mounted on the lower casing head 140, surrounding the hanger 142, the two part clamp may be applied, as shown in Fig. 22, and then turned to tighten the engagement of the threads 152 and 150, to initially set the clamp up against the outer wedging surface of the adapter 146 of the upper casing head 144. When the parts have thus been initially drawn together, the nuts 138 on the bolts 136 of the clamp (Fig. 23) may be tightened to complete the clamping action, as will be evident from consideration of Fig. 22, and the description given above with respect to the preferred embodiment of the clamping connection. The upper surfaces of the threads 152 on the clamp, and in cooperation with the lower surfaces of the threads 150 of the casing head 140, will act as wedging surfaces, similar to the action of surfaces 38 and 18 (Fig. 8) when the nuts 138 of the clamp are tightened, as in the principal embodiment of the invention.

It will be understood that the precise design of the parts disclosed herein, may vary, within limits, while still providing for the practice of the invention. This is true with regard to the design of the tapered inner seating area and outer sealing surfaces, in the various casing head parts. However, and referring to Fig. 8, we have found that a most satisfactory design is provided, if the tapered inner seating area 12 is formed at an angle of 15° from the vertical, as viewed in Fig. 8, such an angle being found to be best adapted to provide minimum stresses in the hanger, when the latter is supporting an inner pipe in the casing head. Similarly, we have found that an angle of 30° from the vertical, is most satisfactory for the outer sealing surface 14, as disclosed in Fig. 8. Throughout the specification, when we refer to casing head parts, we intend to designate these parts broadly, and to include such parts known as tubing heads, as well as the connecting parts of the Christmas tree, such as its adapter.

As stated above, it is contemplated that the invention as described herein, may be used in association with various well known items of equipment, and combinations of equipment, and in practicing procedures as are known in the art. For instance, the invention contemplates the use of casing hangers, and casing hanging procedures, as disclosed in Patents 2,082,413, Mueller et al., dated June 1, 1937; 2,117,444, Mueller et al., dated May 17, 1938; 2,207,469, Roye, dated July 9, 1940; 2,620,880, Mueller et al., dated December 9, 1952; and 2,624,413, Mueller et al., dated January 6, 1953. Also contemplated is the use of such hangers and associated equipment, and practices, as are disclosed in the pending application of Watts et al., Serial No. 315,002, filed October 16, 1952, and Watts application Serial No. 313,706, filed October 8, 1952. The invention is likewise applicable for use with tubing hangers and completion practices as disclosed in Patent 2,241,333, Smith, dated May 6, 1941, and Patent 2,150,887, Mueller et al., dated March 14, 1939. The invention is also intended for use in such practices and in association with control devices, such as back pressure valves as disclosed in Patent 2,148,327, Smith et al., dated February 21, 1939; Patent 2,162,179, Mueller, dated June 13, 1939; Patent 2,241,288, Yancey, dated May 6, 1941, and the invention contemplates insertion and removal of tubing closures as disclosed in these patents, as well as in Patent 2,358,677, Yancey, dated September 19, 1944. For the above purposes, the disclosures of these prior art patents, as specified, are included herein by reference.

We claim:

1. A high pressure coupling comprising first and second conduit parts having end surfaces presented toward one another and securing means for drawing said end surfaces toward one another, each of said conduit parts having aligned fluid passages therein the walls of which terminate in outwardly flaring sealing surfaces adjacent said end surfaces of said parts, and a unitary sealing ring of hard metal or the like for sealing the ends of said parts when they are drawn toward one another, said sealing ring comprising an inner annular flange portion with oppositely disposed flexible lips and an integral substantially centrally disposed external rib portion, and lips having exterior sealing surfaces which taper away from said rib portion and which are adapted to engage and seal with said flared sealing surfaces on said conduit parts and reduce the area subject to pressure to a diameter substantially equal to that of said passages, said rib portion being of substantial thickness as compared with said lip portions and having opposite faces which engage the end surfaces of said conduit parts and limit the degree of movement of said parts toward one another.

2. A construction in accordance with claim 1, wherein said conduit parts are provided with external wedging surfaces at their ends, and wherein said securing means comprises a clamp having a plurality of segmental parts with corresponding wedging surfaces engaging said wedging surfaces on said conduit parts and means to force said segmental parts inwardly toward the axis of said sealing ring to complete the coupling.

3. A construction in accordance with claim 1, wherein said sealing ring has a bore therethrough at least as large as that of the fluid passages through the conduit parts.

4. A construction in accordance with claim 1, wherein the angle of taper of said exterior surfaces of said lips is normally steeper than that of said flaring surfaces of said conduit parts, whereby said lips are yieldingly flexed inwardly when said conduit parts are drawn toward one another so that their exterior surfaces maintain themselves tightly and flush against the flaring surfaces of said conduit parts when the latter are drawn toward one another.

5. A construction in accordance with claim 4, wherein said rib of said sealing ring is of such thickness that its faces engage and stop the inward movements of the end surfaces of said conduit parts when said lips have been flexed until their exterior surfaces are parallel and flush with said flaring surfaces of said conduit parts.

6. A construction in accordance with claim 4, wherein said end surfaces of said conduit parts are flat and disposed in planes parallel to those of the flat faces of said rib portion, whereby said sealing surfaces and said flat surfaces and faces are in intimate contact to form a substantially unitary structure when said conduit parts are fully drawn toward one another.

7. Apparatus for completing a well in formation having high pressure comprising a casing head having a bore therethrough substantially as large as the interior diameter of the casing on which it is mounted, said casing head having an exterior connecting flange at its upper end and an upwardly and outwardly opening bowl at the upper end of said bore of such length as to provide a lower hanger seating area and an upper flaring sealing surface within said bowl, a hanger for an inner pipe supported in the seating area of said bowl, said hanger having a maximum diameter less than that of said sealing surface, and a sealing ring adapted for insertion over said hanger and having a tapered surface engaging the sealing surface of said bowl while said hanger remains landed therein, said sealing ring having an internal diameter greater than the maximum outside diameter of said hanger whereby said hanger may be passed through said ring.

8. Apparatus for completing a well in formation having high pressure comprising a casing head having a bore therethrough substantially as large as the interior diameter of the casing on which it is mounted, said casing head having an exterior connecting flange at its upper end and an upwardly and outwardly opening bowl at the upper end of said bore of such length as to provide a lower hanger seating area and an upper flaring sealing surface within said bowl, a hanger for an inner pipe supported in the seating area of said bowl and an annular sealing ring engaging on said sealing surface of said bowl, said sealing ring being formed with a sealing surface to seal with well head parts which may be mounted above said casing head, said sealing ring having a bore therethrough greater than the maximum diameter of said seating area and said hanger to pass the latter therethrough for landing in the seating area of said bowl and to provide for inserting said sealing ring over said hanger and on to said sealing surface when said hanger is landed in preparation for mounting well head parts above said casing head.

9. Apparatus for completing a well in formation having high pressure comprising a casing head having a bore therethrough substantially as large as the interior diameter of the casing on which it is mounted, said casing head having an exterior connecting flange at its upper end and a downwardly tapering bowl at the upper end of said bore of such length as to provide a lower downwardly tapering seating area to receive a hanger for an inner pipe and an upper downwardly tapering sealing surface within said bowl surrounding said seating area to receive a sealing ring formed to seal with an upper well head part which may be mounted above said casing head, the taper of said hanger seating area being steeper than that of said sealing surface.

10. Apparatus for completing a well in formation having high pressure comprising a casing head having a bore therethrough substantially as large as the interior diameter of the casing on which it is mounted, said casing head having an exterior connecting flange at its upper end and an upwardly and outwardly opening bowl at the upper end of said bore of such length as to provide a lower hanger seating area and an upper flaring sealing surface within said bowl, an annular sealing ring of hard metal or the like engaging on said upper sealing surface of said bowl, said sealing ring having an upper exterior sealing surface which is presented upwardly from said connecting flange, and control equipment including an adapter mounted above said connecting flange and having a sealing surface which engages said upper sealing surface on said ring, said sealing ring having a bore therethrough of diameter at least as large as the maximum diameter of said lower seating area to leave said seating area exposed and to permit passing a hanger therethrough for landing in the seating area of said bowl, said adapter having a bore therethrough which is substantially equal to that through said sealing ring.

11. In apparatus for completing wells above casing entering formation having high pressure, a lower casing head part having a bore therethrough at least as large as the casing on which it is mounted and an interior upwardly and outwardly flaring sealing surface at the upper end of said bore, an upper casing head part having an interior upwardly and inwardly tapering sealing surface positioned above said sealing surface on said lower casing head part, a removable sealing ring of metal or the like disposed between said parts and in engagement with said sealing surfaces, said lower and upper casing head parts having exterior connecting flanges surrounding said sealing surfaces and presented toward one another and which have respectively, upwardly and outwardly and downwardly and outwardly tapered exterior wedging surfaces, and a clamping assembly including a plurality of clamping segments which surround said flanges and which have corresponding lower and upper tapered wedging surfaces to engage the respective wedging surfaces of said flanges, said assembly having laterally extending means to tightly draw said segments toward one another to thereby force said flanges toward one another, said sealing ring having exterior bottom and top sealing surfaces which taper respectively, downwardly and inwardly, and upwardly and inwardly, and which engage and seal with the respective sealing surfaces of said lower and upper casing head parts when said clamping segments are drawn toward one another.

12. A construction in accordance with claim 11, wherein said sealing ring is provided with an integral external rib which extends outwardly between said flanges and limits the degree of movement of said flanges toward one another.

13. A construction in accordance with claim 11, in which said removable sealing ring is formed around a hanger having means for suspending an inner well pipe.

14. In apparatus of the character described, a first casing head part having a bore at least as large as the casing on which it is mounted and an exterior top connecting flange, said first casing head part having an upwardly presented inside bowl including a central hanger seat and a surrounding upwardly and outwardly flaring sealing surface within said flange, a sealing ring of hard metal or the like having a bottom exterior downwardly and inwardly tapered sealing surface positioned on said sealing surface of said first casing head part and a top exterior inwardly and upwardly tapering sealing surface which extends above the upper end of said first casing head part to seal with control equipment mounted thereon, said sealing ring having a bore at least as large as the maximum diameter of said hanger seat to leave said hanger seat exposed, a hanger to support an inner pipe having an outside diameter small enough to pass through the bore of said ring and a bottom seating surface to land in said hanger seat, said hanger having a top exterior sealing surface positioned to extend above the upper end of said first casing head part when said hanger is landed therein to seal with a second casing head part when the latter replaces the control equipment.

15. A construction in accordance with claim 14, wherein said sealing ring is provided with an integral external rib which rests on the inner part of said top connecting flange of said first casing head part.

16. A construction in accordance with claim 14, wherein said first casing head part has releasable means to lock said hanger in its seat.

17. A construction in accordange with claim 14, wherein said first casing head part is provided with releasable locking screws positioned below said top connecting flange to lock said hanger in its seat.

18. Apparatus for completing a well in formation having high pressure comprising a casing head having a bore therethrough at least as large as that of the casing on which it is mounted and exterior securing means at its upper end, said casing head having an interior bowl comprising an inner hanger seating area and an outer sealing surface flaring upwardly and outwardly and located below the upper end of said casing head, a sealing ring of hard metal or the like positioned in said casing head and having a bottom exterior downwardly and inwardly tapered sealing surface engaging said sealing surface of said casing head and having a top exterior upwardly and inwardly tapered sealing surface which protrudes upwardly from the upper end of said casing head, said sealing ring having a bore at least as large as the maximum diameter of said hanger seating area to leave said hanger seating area exposed, control equipment comprising an adapter with exterior cooperating securing means to connect with said casing head securing means and having at its lower end an inside downwardly flaring sealing surface to engage and seal with said top sealing surface of said ring, said securing means providing for tightening movement of said adapter toward said casing head to effect a fluid tight seal against the top and bottom sealing surfaces of said ring, said adapter having a bore at least as large as that of said ring, and a hanger for an inner pipe of maximum exterior diameter less than that of the bore of said ring and having a seating area to land in said seating area of said casing head.

19. A construction in accordance with claim 18 wherein said sealing ring has a relatively thick integral exterior rib which extends outwardly between the upper end of said casing head and the lower end of said adapter and within the exterior securing means thereof.

20. Apparatus for completing a well in formation having high pressure comprising a casing head having a bore therethrough at least as large as the interior diameter of the casing on which it is mounted, said casing head having an upwardly and outwardly flared bowl at the upper end of said bore of such length as to provide an upper sealing surface and a lower seating area, said casing head having an exterior securing flange at its upper end, a sealing ring of hard metal or the like having a bottom exterior downwardly and inwardly tapered sealing surface to seal upon said upper sealing surface of said casing head, said ring having a bore of diameter at least as large as the maximum diameter of said lower seating area to leave said lower seating area of said casing head exposed when said ring is in sealing position on said upper sealing surface, control equipment comprising an adapter secured on said head and having a bore at least as large as that of said ring and having an exterior flange at its lower end for connection with the flange of said head, said sealing ring having a top exterior upwardly and inwardly tapered sealing surface which extends above the upper end of said head, said adapter having an inside downwardly flared sealing surface to engage said top surface of said ring, means for forcing said adapter flange toward said casing head flange to effect a fluidtight seal against the top and bottom sealing surfaces of said ring, and a hanger for an inner pipe of diameter to pass through said control equipment and said ring, said hanger having a lower exterior downwardly and inwardly tapered seating area to seat upon said seating area of said head when said hanger is landed in said head.

21. A construction in accordance with claim 20, wherein said sealing ring has an exterior rib extending outwardly between said flanges to limit the movement of said adapter flange toward said casing head flange.

22. A unitary continuous closed sealing ring of hard metal or the like for the purpose described, comprising an inner annular flange portion with oppositely disposed flexible lips and an integral substantially centrally disposed external rib portion, said lips having exterior sealing surfaces which taper outwardly toward said rib portion at an acute angle with respect to the longitudinal axis of said sealing ring.

23. A sealing ring as defined in claim 22, wherein said lips have inner surfaces which taper outwardly from the center of said flange portion at an acute angle with respect to the longitudinal axis of said ring and which angle is less than said acute angle of said exterior sealing surfaces of said lips.

24. A sealing ring as defined in claim 22, wherein said external rib is of such mass, as compared with said annular flange, that it maintains a constant diameter when said lips are flexed inwardly.

25. A sealing ring as defined in claim 22, wherein said rib has relatively long opposite flat surfaces which extend in planes radial from the axis of said ring.

26. A tubing hanger comprising an elongated body having upper and lower portions, said upper portion having an inwardly and upwardly tapering sealing surface at the top of the hanger and a downwardly and inwardly tapering seating surface below said first named surface, said surfaces having rings of packing material therein, the lower portion of said hanger having a shoulder disposed below said downwardly tapering seating surface to receive the end of a locking screw to lock the hanger in the seat of a tubing head, said hanger having a longitudinal bore therethrough and means in said bore to engage a tubing suspended from the hanger.

27. A tubing hanger comprising an elongated body having upper and lower portions, said upper portion having an inwardly and upwardly tapering sealing surface at the top of the hanger and a seating surface below said inwardly tapering sealing surface, the lower portion of said hanger having a shoulder spaced below said seating surface on said hanger to receive the end of a locking screw to lock the hanger in the seat of a tubing head, said hanger having a longitudinal bore therethrough and means in said bore to suspend the tubing from the hanger.

28. Apparatus for completing a well in formation having high pressure comprising a casing head having a bore therethrough substantially as large as the interior diameter of the casing on which it is mounted, said casing head having an exterior connecting flange at its upper end and an outwardly and upwardly opening bowl at the upper end of said bore of such length as to provide a lower hanger seating area and an upper sealing surface at the upper end of and within said bowl, and an annular sealing ring of hard metal or the like having a lower flexible lip engaging on said upper sealing surface of said bowl and which is formed with an upper flexible lip to seal with well head parts which may be mounted above said casing head, said sealing ring having a bore therethrough of diameter at least equal to the maximum diameter of said lower seating area to leave said seating area exposed and to permit passing a hanger therethrough for landing in the seating area of said bowl.

29. Apparatus for completing a well above casing extending to formation having high pressure comprising a tubing head having a bore therethrough at least as large as the casing on which it is mounted, said head having an upwardly presented bowl including a lower hanger seat and an upper sealing surface positioned near the upper end of said head, an annular sealing ring of metal or the like disposed in said head on said sealing surface, and a tubing hanger having an upper part and a lower part with a seating surface to land in said hanger seat, said hanger being of maximum outside diameter less than the interior diameter of said sealing ring, said hanger having an upper sealing surface extending above the upper end of said head adapted to seal with equipment mounted on said head, and pressure-proof locking screws extending through said head below said seat and engaging the lower part of said hanger when same is landed to lock the hanger sealed in said head.

References Cited in the file of this patent

UNITED STATES PATENTS

| Number | Name | Date |
|---|---|---|
| 709,093 | Wiedeman | May 16, 1905 |
| 951,704 | Schmidt | Mar. 8, 1910 |
| 1,093,868 | Leighty | Apr. 21, 1914 |
| 1,876,455 | Inshaw | Sept. 6, 1932 |
| 1,891,424 | Kirkpatrick | Dec. 20, 1932 |
| 2,148,327 | Smith et al. | Feb. 21, 1939 |
| 2,178,700 | Penick et al. | Nov. 7, 1939 |
| 2,207,471 | Yancey | July 9, 1940 |
| 2,337,221 | Allen | Dec. 21, 1943 |
| 2,486,120 | Colton et al. | Oct. 25, 1949 |
| 2,624,413 | Mueller et al. | Jan. 6, 1953 |
| 2,638,169 | Crain | May 12, 1953 |

FOREIGN PATENTS

| Number | Country | Date |
|---|---|---|
| 801,604 | Germany | Jan. 15, 1951 |

U. S. DEPARTMENT OF COMMERCE
PATENT OFFICE

CERTIFICATE OF CORRECTION

Patent No. 2,766,829            October 16, 1956

John D. Watts et al.

It is hereby certified that error appears in the printed specification of the above numbered patent requiring correction and that the said Letters Patent should read as corrected below.

Column 16, line 13, before "lips" strike out "and" and insert instead --said--.

Signed and sealed this 15th day of April 1958.

(SEAL)
Attest:
KARL H. AXLINE
Attesting Officer

ROBERT C. WATSON
Commissioner of Patents